(No Model.)
F. R. GRISCOM.
PLANTING IMPLEMENT.
No. 389,925. Patented Sept. 25, 1888.
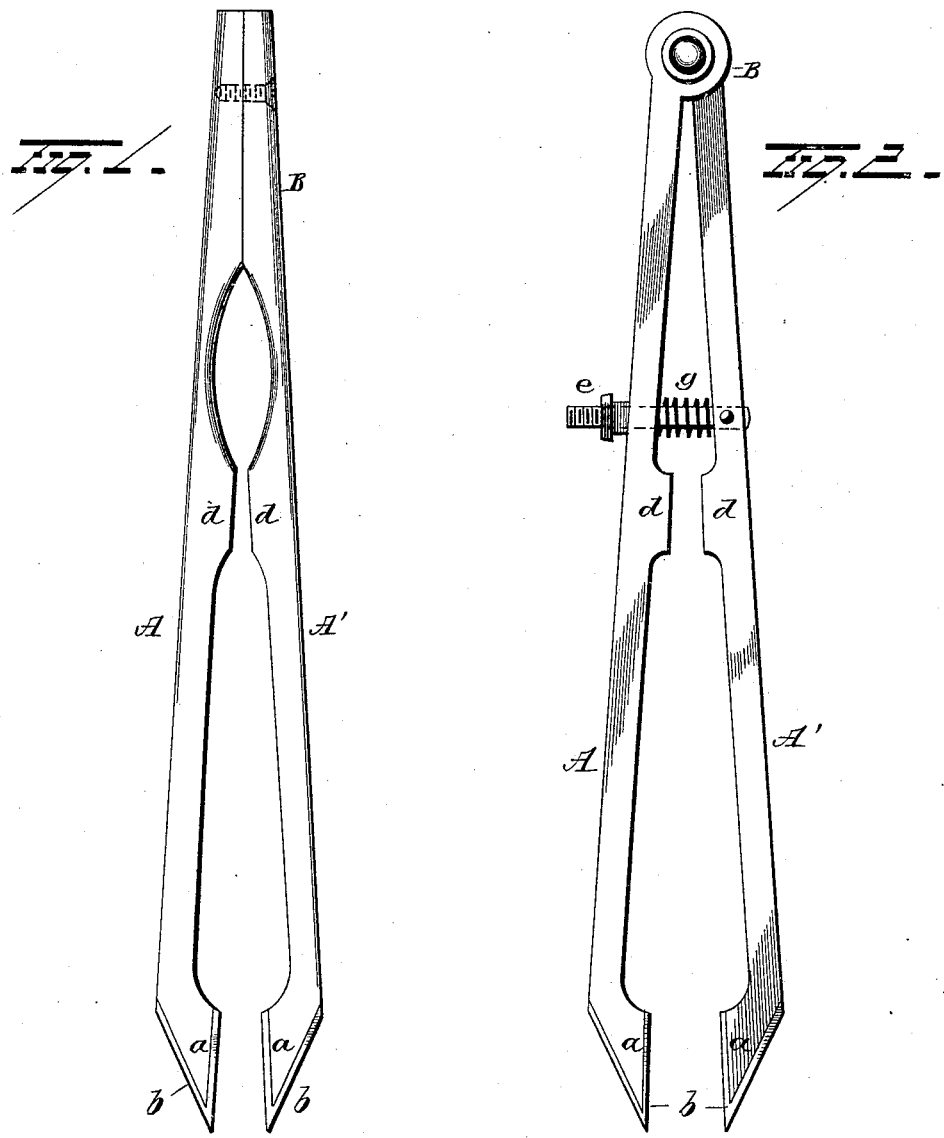
Witnesses
E. Nottingham
G. F. Downing
Inventor
Ferdinand R. Griscom
By his Attorney
H. A. Seymour

UNITED STATES PATENT OFFICE.

FERDINAND R. GRISCOM, OF ANNAPOLIS, MARYLAND.

PLANTING IMPLEMENT.

SPECIFICATION forming part of Letters Patent No. 389,925, dated September 25, 1888.

Application filed February 18, 1888. Serial No. 264,459. (No model.)

*To all whom it may concern:*

Be it known that I, FERDINAND R. GRISCOM, of Annapolis, in the county of Anne Arundel and State of Maryland, have invented certain new and useful Improvements in Planting Implements; and I do hereby declare the following to be a full, clear, and exact description of the invention, such as will enable others skilled in the art to which it appertains to make and use the same.

My invention relates to an improvement in planting implements.

Heretofore implements have been in use for weeding in which a pair of spring-jaws were connected together by means of a spring-plate, and as a means of locking jaws of this character a set-screw has been employed, arranged in a manner similar to that commonly employed in ordinary calipers.

The object of my present invention is to provide an implement which may be easily and quickly manipulated in picking up and setting small plants into the ground and in packing the earth about them; and it consists, substantially, in a pair of spring jaws or arms of substantially the form herein described and illustrated.

In the accompanying drawings, Figure 1 is a view in perspective of my improved planting implement, and Fig. 2 is a modification.

A A' represents a pair of similarly-shaped jaws rigidly secured together at one end. These jaws may be of considerable length, and they are either integral or secured together at one end, so that their working or gripping ends are normally slightly removed from each other. This end may be rounded off or otherwise finished to form a handle, B. The jaws throughout their length are desirably slender and are slightly yielding. At their gripping ends they project inwardly toward each other, and their gripping-faces *a* are approximately parallel to each other when together, so as to receive and hold the plant while the latter is being picked up and inserted into the ground. The outer ends are beveled, so that each jaw is pointed, and the jaws when together also form a sharp point in order that they may easily penetrate the soil. These ends *a* are tipped with metal, *b*, to make them sharper and prevent their becoming easily blunted or broken by contact with hard material, and their gripping-faces may be faced with rubber to prevent injuring the plants. Near the upper end or handle each jaw is provided with a projection, *d*, in position to abut against each other when the jaws are closed and a plant is grasped. These abutments also prevent the jaws being closed too tightly upon the tender plant.

In the modification shown in Fig. 2 the spring jaws or arms are pivoted together at one end, B, and in order to hold the jaws normally apart a rod, *e*, is secured to one jaw about midway between the pivotal point and the projection *d*. The opposite end of the rod projects loosely through a perforation in the other jaw, and a spiral spring, *g*, mounted on this rod is adapted by its elastic force to abut against the jaws and hold them normally separated.

In the operation of my device the plants—such as tobacco-plants or the like—are strewn along the ground, and then with this implement they are picked up one by one and inserted into the soil, the operator placing one hand on the handle B, while the jaws are held together with the other hand. Now, upon placing the plant in the ground at the required position and depth, the operator lets go of the jaws, allowing them to open to their normal position, and draws the implement out of the ground with slight disturbance to the plant. The dirt is then packed about the roots of the plants by means of the flattened and beveled ends of the implement.

Having fully described my invention, what I claim as new, and desire to secure by Letters Patent, is—

A planting implement consisting of a pair of arms connected at one end, the said arms having gripping-jaws at their opposite ends, and provided at points between their ends with inwardly-projecting stops, substantially as set forth.

In testimony whereof I have signed this specification in the presence of two subscribing witnesses.

FERDINAND R. GRISCOM.

Witnesses:
S. F. RAWLINGS,
H. T. HOPKINS.